June 12, 1951  L. M. CARLSON  2,556,797
HAND OPERATED SCRAPING TOOL
Filed July 17, 1947
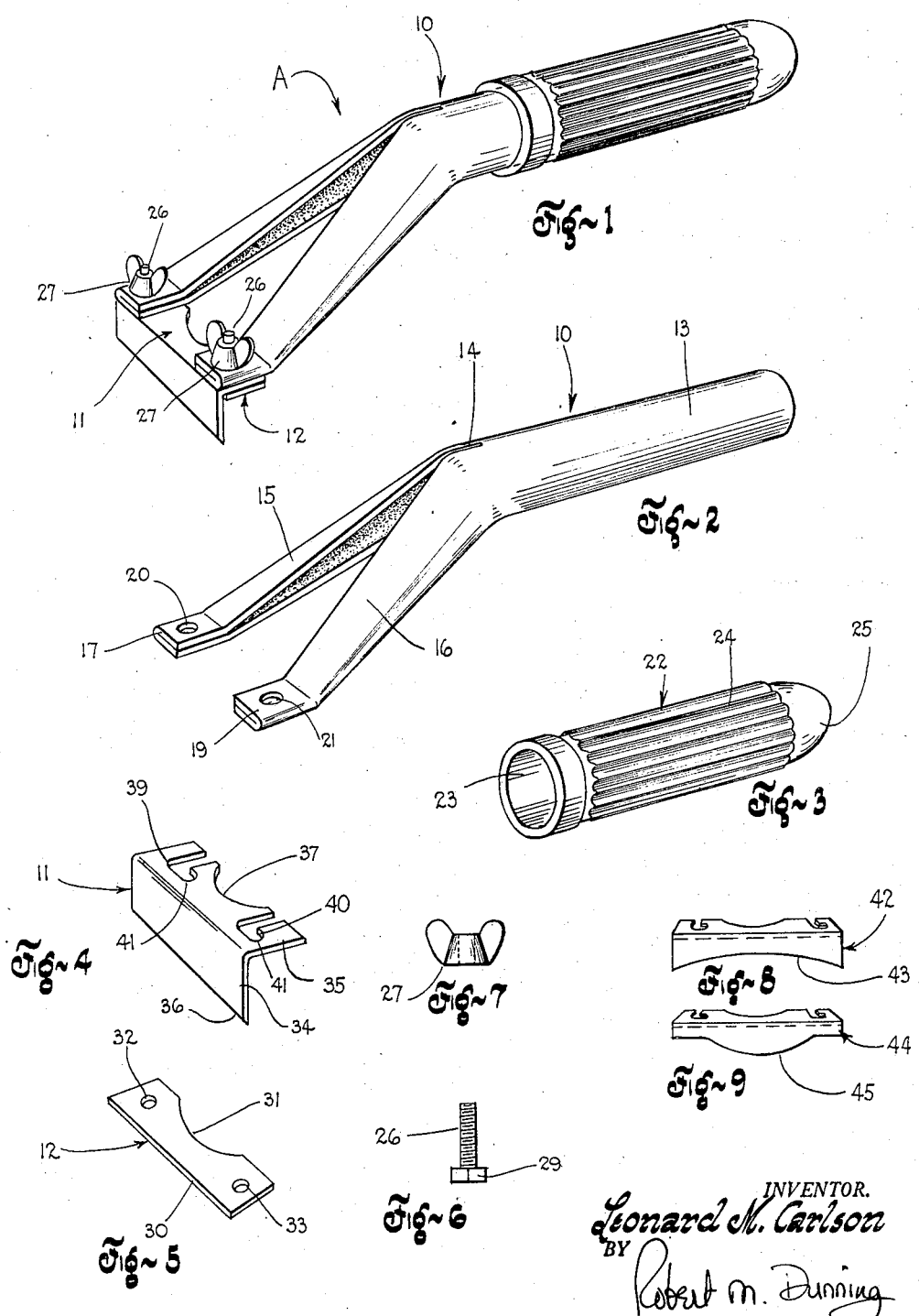
INVENTOR.
Leonard M. Carlson
BY
Robert M. Dunning Patented June 12, 1951

2,556,797

UNITED STATES PATENT OFFICE 2,556,797

HAND-OPERATED SCRAPING TOOL

Leonard M. Carlson, St. Paul, Minn.

Application July 17, 1947, Serial No. 761,489

3 Claims. (Cl. 15—236)

My invention relates to an improvement in hand operated scraping tool wherein it is desired to provide an apparatus for use in scraping surfaces of various shapes.

Certain difficulties are involved in scraping members of various outline shapes. For example in scraping moldings and similar structures, a scraper blade must be employed which is perfectly shaped to fit the particular molding in question. Furthermore, difficulty is often experienced in properly guiding the scraper in its operation. This fact is particularly true because of the fact that if the scraper is operated by a pulling motion the blade is usually concealed from view by the scraper handle.

The object of the present invention is to provide a scraper which will avoid the difficulties previously encountered with devices of this type. My scraper is provided with interchangeable blades which makes it possible to properly scrape surfaces having various outline shapes. My scraper is also so designed that it may be operated by a pulling motion without hiding the blade from view. My scraper is also so designed that the blade will not become clogged with scrapings as the blade moves along the surfaces to be scraped.

A feature of the present invention lies in the simplicity and economy of the structure which I employ. My scraper blade handle comprises a tubular member which is centrally split longitudinally for a considerable part of its length. The split sides of the tubular member are spread apart and are bent angularly to form a pair of spaced supports which are terminally connected to the scraper blade. This handle may thus be formed at an extremely low cost and yet is simple to manufacture and extremely strong and rigid in structure.

A feature of the present invention lies in the provision of a scraper blade handle having spaced diverging arms which connect the handle to a scraper blade of the type to be pulled over the surface to be scraped. I have found that a scraper which operates by a pulling motion is easier to operate than a device which operates with a pushing motion.

A feature of the present invention lies in the provision of a scraper blade handle which is detachably connected to scraper blades of angular construction. One side of the angle forms a means of connecting the blade to the handle, while the other side of the angle forms the actual scraping blade.

A feature of the present invention lies in the provision of a scraper having angle blades supported by a bifurcated handle and in cutting one angle of the blades away at its center between the arms of the handle so that the blade may be viewed during the scraping operation. A clear view of the blade may be obtained by the operator between the diverging ends of the handle.

A feature of the present invention lies in the provision of a scraper blade having a handle provided with a bifurcated end which supports a scraper blade on a plane off-set from the axis of the handle. As a result the hands engaging the handle are spaced from the surface to be scraped, while the scraping blade is approximately at right angles to the surface being scraped.

An added feature of the present invention lies in the provision of a handle having a bifurcated end to which a clamping plate is secured and in the provision of angularly shaped blades having L-shaped slots therein. The L-shaped slots are spaced to accommodate clamping bolts connecting the clamping plate to the spaced extremities of the handle. The slotted side of each angularly shaped blade is clamped between the clamping plate and the spaced ends of the handle, thus simplifying the attachment and detachment of the various blades.

These and other objects and novel features of my invention will be more clearly and fully set forth in the following specification and claims.

In the drawings forming a part of my specification:

Figure 1 is a perspective view of my scraper in readiness for operation.

Figure 2 is a perspective view of the handle member alone.

Figure 3 is a perspective view of the handle grip which may be telescoped onto the handle element of Figure 2.

Figure 4 is a perspective view of a blade which may be used on the scraper.

Figure 5 is a perspective view of a clamping plate which may be used to clamp the scraper blade in place.

Figure 6 is an elevation view of a clamping bolt used in conjunction with my scraper.

Figure 7 is an elevation view of a wing nut used in combination with the bolt of Figure 6.

Figure 8 is a perspective view of a modified form of scraper blade.

Figure 9 is a perspective view of a second modified form of scraper blade.

The scraper A is illustrated in its assembled form in Figure 1 of the drawings. The scraper A includes a handle element which is indicated in general by the numeral A, a scraper blade which is indicated in general by the numeral 11, and having a clamping plate which is illustrated in general by the numeral 12. These elements are attached together as shown in Figure 1 and as will be later described in detail.

The handle 10 is best illustrated in Figure 2 of the drawings. This handle comprises a hollow tubular body 13 which is split diametrically as indicated at 14 so as to provide a cylindrical handle portion and a pair of spaced diverging arms 15 and 16. The tubular body 13 is split apart on opposite sides of the diametrical cut 14 to form the arms 15 and 16, and these arms are bent to diverge forwardly and outwardly from their connection with the cylindrical portion 13. Furthermore, the semi-circular sleeves forming the arms 15 and 16 are flattened together at their extremities to form flattened double thickness ends 17 and 19. These ends are provided with apertures 20 and 21 as best illustrated in Figure 2 to accommodate the clamping bolts later described. If desired the handle grip 22 may be inserted upon the cylindrical sleeve member 13 of the handle to form a better and more attractive hand hold. The grip 22 comprises a hollow cylindrical body having an axial aperture 23 therein designed to enclose the tubular handle portion 13. The outside of the member 22 is ribbed or roughened as indicated at 24 and one extremity of the handle body is closed as indicated at 25. Thus a handle grip is formed similar to the grip used on a bicycle handle and this grip is frictionally engaged upon the tubular handle portion 13.

A clamping plate 12 best illustrated in Figure 5 of the drawings is secured to the flattened ends 17 and 19 of the handle by means of the clamping bolt 26 and the wing nut 27 illustrated in Figures 1, 6, and 7 of the drawings. The clamping bolts 26 are provided with rectangular or multi-sided heads 29 for holding the bolts from rotation when the clamping plate is in place.

The clamping plate 12 is provided with a straight outer wall 30, and an inwardly curved inner wall 31 as shown in Figure 5. Apertures 32 and 33 are provided which are arranged in registry with the apertures 20 and 21 of the handle extremities 17 and 19. The clamping bolts 26 extend through the apertures 32 and 20 and the apertures 33 and 21 to hold the clamping plate connected to the handle. The wing nuts 27 engage the clamping bolts 26 above the flattened ends 17 and 19. The scraper blade 11 illustrated in Figure 4 of the drawings is typical of the type of scraper blade which may be employed on my scraper. The blade 11 is angular in cross section including a generally vertical flange 34 and a generally horizontal flange 35. The flange 34 is sharpened at its lower extremity 36 to act as a scraping edge. The flange 35 is curved inwardly along its upper edge as indicated at 37 to fit the curvature of the curved edge 31 of the clamping plate 12. Spaced L-shaped slots 39 and 40 are spaced apart suitable to accommodate the clamping bolts 26. By forcing the scraper blade 11 rearwardly and then moving the blade transversely, the bolts 26 may be engaged in the extremities 41 of the slots 39 and 40, thus holding the scraper blade in proper position relative to the handle and the clamping plate 12.

In order to hold the blade 11 in place the wing nuts 27 are tightened, thus drawing the clamping plate 12 against the undersurface of the flange 35 of the plate. It will be noted that the square head 29 of the clamping bolts engages against the vertical flange of the scraper blade to hold the clamping bolts from rotation. This arrangement has a dependent function. In the first place the vertical flange 34 forms a simple means of holding the clamping bolts from rotation. Secondly the tendency for the clamping bolts to rotate causes a forward force against the flange 34 tending to push the scraper blade forwardly. If the scraper blade is not properly engaged at the extremities 41 of the slots 39 and 40, the scraper blade may move forwardly upon rotation of the bolts 26, thus preventing the tightening of these bolts. Thus it is difficult to clamp the plate in place unless the blade is properly engaged.

In Figures 8 and 9 of the drawings I disclose modified forms of blade constructions which are somewhat similar to that shown in Figure 4, with the exception of the shape of the cutting surface. The scraper blade 42 illustrated in Figure 8 of the drawings is provided with a concave cutting edge 43 and this blade is thus designed to scrape an outwardly rounded surface. The scraper blade 44 illustrated in Figure 9 of the drawings is provided with a cutting surface which is flat at opposite ends and is provided with a convex intermediate portion 45. Thus the scraper is designed to extend into shallow grooves to scrape the surface thereof. Obviously other shapes of blades may be employed for scraping moldings and the like.

It will be noted that the arms 15 and 16 are spread apart adjacent the blade a distance sufficient to allow the blade to be seen therebetween. As a result a clear view of the scraping operation is provided. Furthermore, the concave upper surface of each of the scraper blades prevents excess of material from building up on the rear surface of the blade, thereby impairing the scraping operation. If a considerable thickness of scraped material is provided behind the blade, this material may pass through the space between the handle ends and escape from its position forwardly of the blade.

In accordance with the patent statutes, I have described the principles of construction and operation of my scraper blade construction and while I have endeavored to set forth the best embodiments thereof, I desire to have it understood that obvious changes may be made within the scope of the following claims without departing from the spirit of my invention.

I claim:

1. A scraper including a handle, a pair of diverging arms at one end thereof, a clamping plate, a clamping bolt extending through each of said arms and through an end of said clamping plate, rectangular heads on said bolts beneath said clamping plate, a scraper blade having two angularly related flanges designed to be clamped between said clamping plate and said arms, said blade having one flange through which said bolts extend and a second flange against which the heads of said bolts engage to prevent rotation thereof.

2. A scraper comprising a hollow tubular handle which is split on a diametric plane throughout a portion of its length, the split portions of the handle being arranged in diverging relationship, and flattened at their extremities and tapering in thickness from substantially semi-cylindrical form at the beginning of the split to flat form at the extremities, the flattened extremities being on a substantially common plane, and a blade removably connected to said flat ends.

3. A scraper comprising a tubular handle which is split on a diametric plane longitudinally throughout a portion of its length, the split ends of the handle being bent to provide outwardly diverging arms, flattened extremities of double thickness on said arms, the arms tapering in thickness from substantially semi-cylindrical form at the end of the split to flat form at the extremities, and a scraper blade having two angularly related flanges secured transversely to said arms.

LEONARD M. CARLSON.

REFERENCES CITED

The following references are of record in the file of this patent:

UNITED STATES PATENTS

| Number | Name | Date |
|---|---|---|
| 140,599 | Summiter | July 8, 1873 |
| 516,225 | Perkins | Mar. 13, 1894 |
| 647,225 | Graham | Apr. 10, 1900 |
| 691,801 | Palmer | Jan. 28, 1902 |
| 1,228,935 | Lilpakka | June 5, 1917 |
| 1,835,042 | Hammer | Dec. 8, 1931 |
| 1,927,202 | Burdick | Sept. 19, 1933 |
| 1,964,947 | Hentschel | July 3, 1934 |
| 2,162,117 | Perry | June 13, 1939 |

FOREIGN PATENTS

| Number | Country | Date |
|---|---|---|
| 293,818 | Great Britain | July 13, 1928 |